3 Sheets--Sheet 2.

J. RUSSELL.
Adjustable Nuts.

No. 136,184. Patented Feb. 25, 1873.

Witnesses,
M. L. Boynton
H. E. Moseley

Inventor,
James Russell
By T. A. Curtis,
his atty.

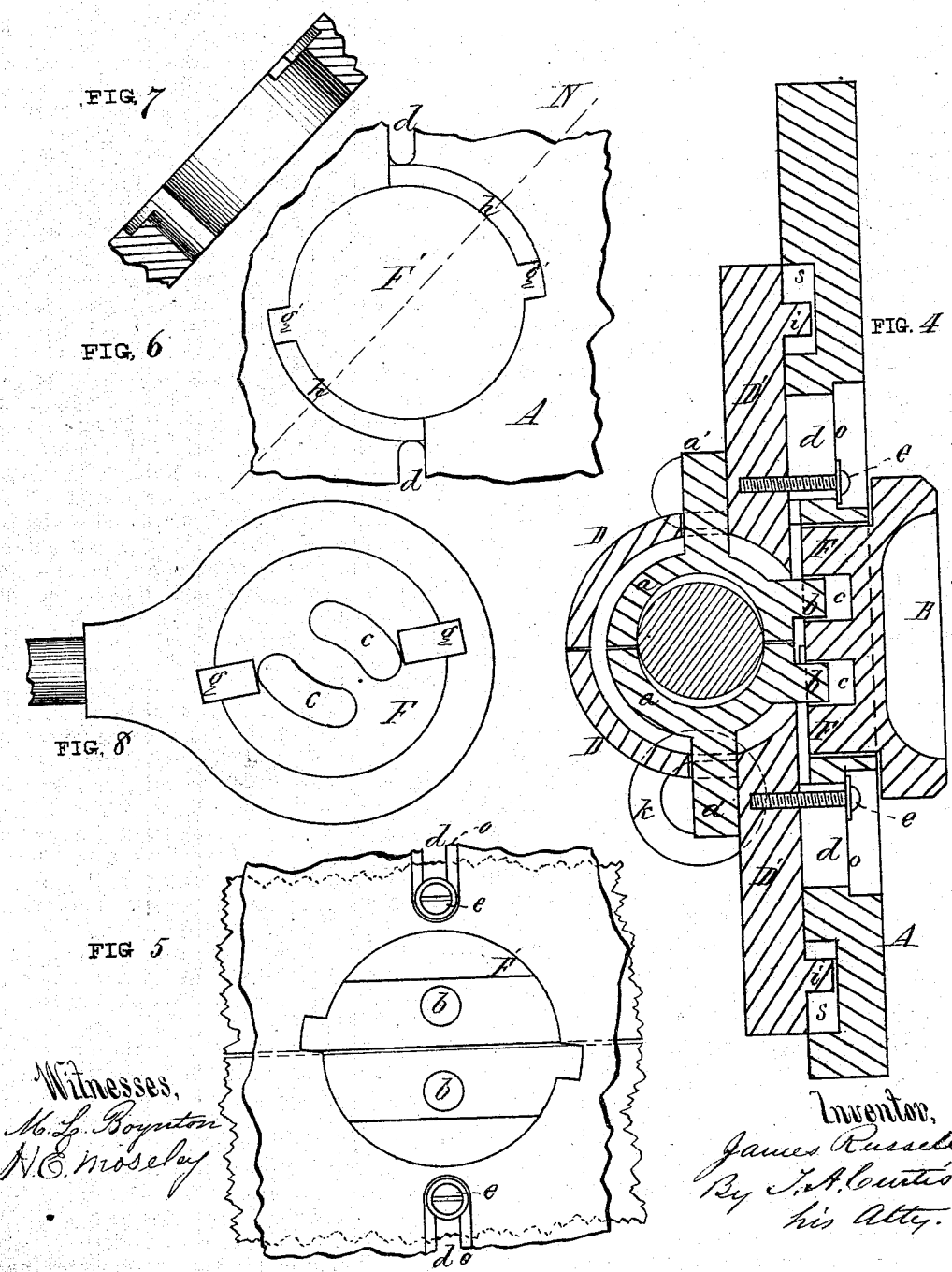

UNITED STATES PATENT OFFICE.

JAMES RUSSELL, OF SPRINGFIELD, MASSACHUSETTS.

IMPROVEMENT IN ADJUSTABLE NUTS.

Specification forming part of Letters Patent No. 136,184, dated February 25, 1873.

*To all whom it may concern:*

Be it known that I, JAMES RUSSELL, of Springfield, in the county of Hampden and State of Massachusetts, have invented a new and useful Adjustable Nut; and I do hereby declare that the following is a full, clear, and exact description thereof, reference being had to the accompanying drawing making a part of this specification, and to the letters of reference marked thereon, in which—

Figure 1:
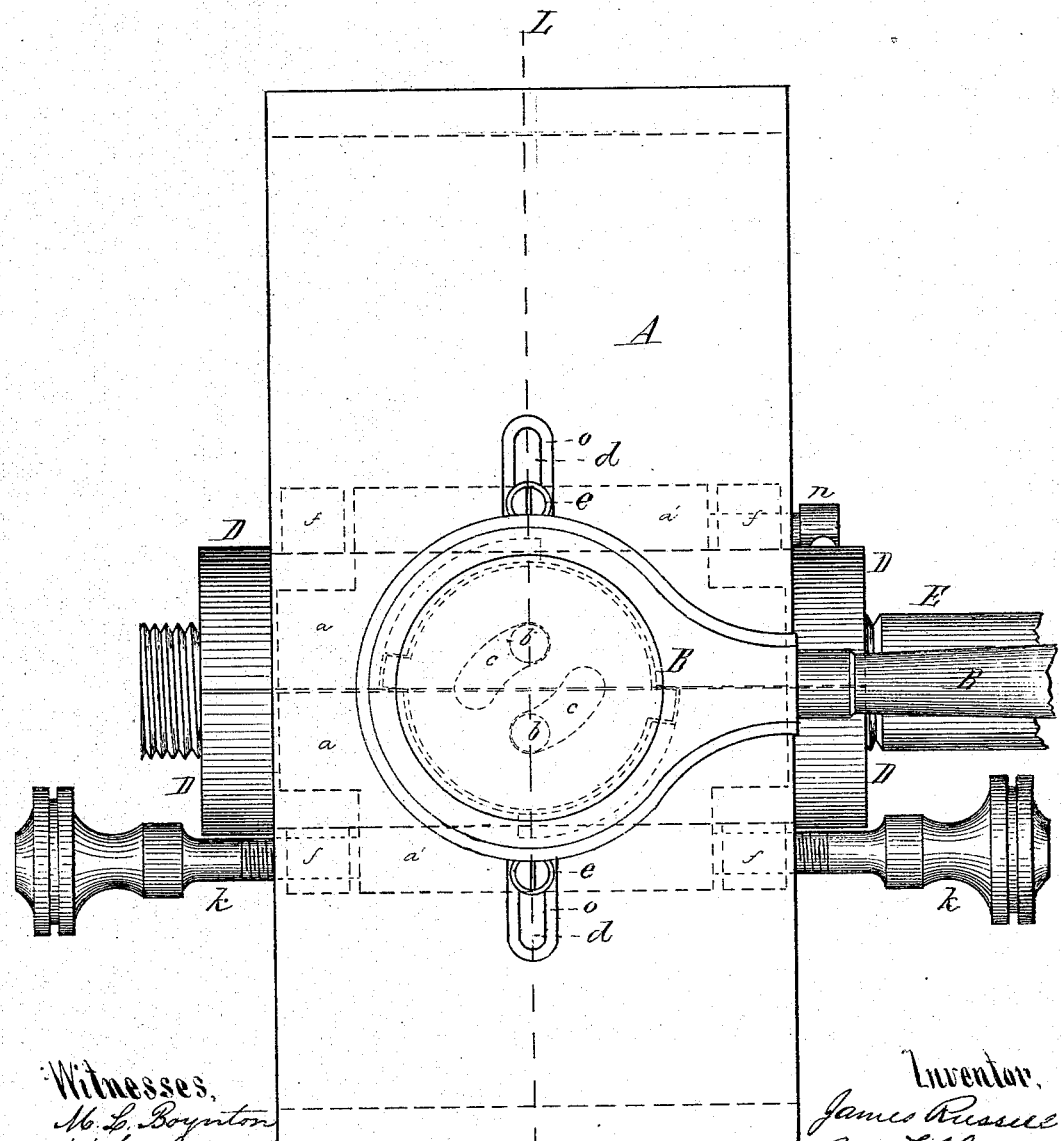
Figures 2, 3:
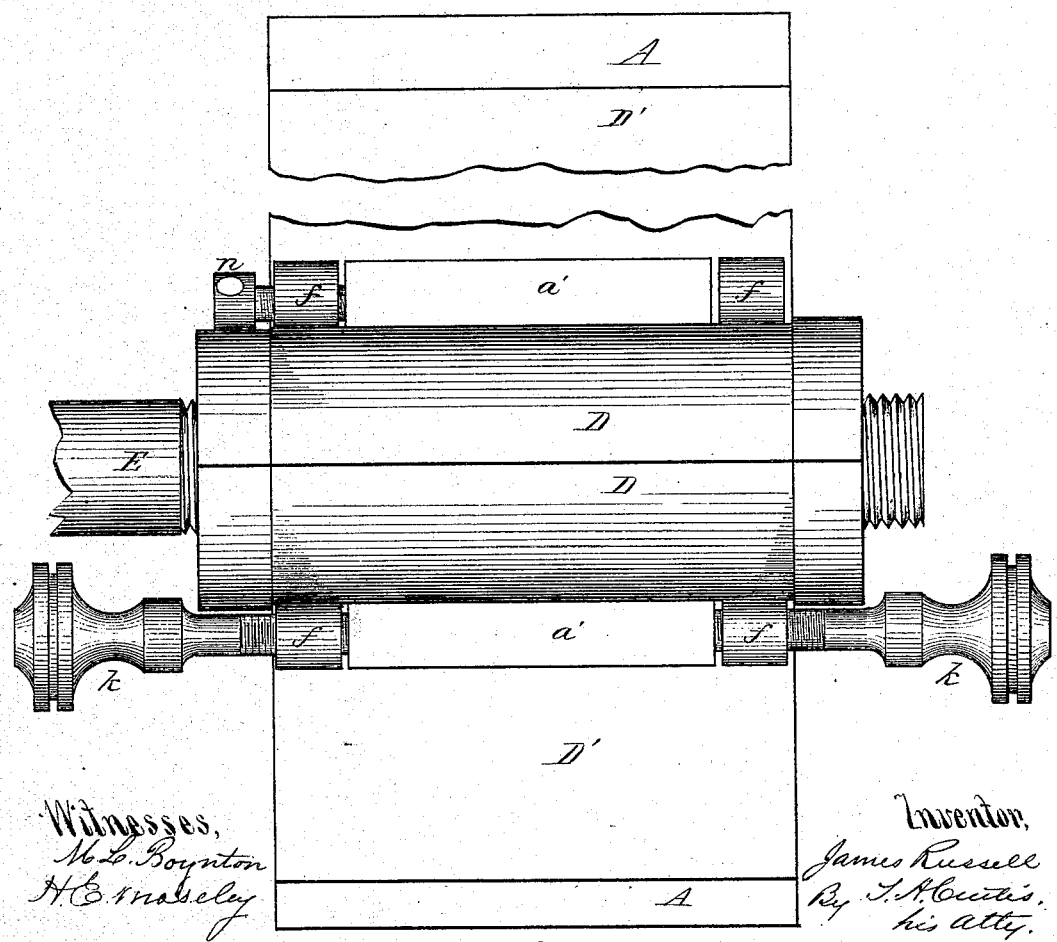

Figure 1 is a plan view of my invention. Fig. 2 is a reverse-plan view of the same. Fig. 3 is a side view of the outer shell and its plate. Fig. 4 is a vertical section through line L of Fig. 1. Fig. 5 is a plan view showing the aperture in the top plate through which the nut is operated. Fig. 6 is a reverse-plan view of the same. Fig. 7 is a vertical section of the same through line N of Fig. 6, and Fig. 8 is a reverse-plan view of the operating-lever.

My invention relates to a device for taking up the "backlash" of a nut as it becomes worn in operating upon a screw; and it consists of a plate having attached thereto two other plates, each having a longitudinal slot therein, with the nut between them in such manner that the two plates may be moved to and from each other upon the main plate. The nut is also made in two halves, each having thereon a lip extending through one of the plates between two screws attached to said plates, one at each end, by means of which each half of the nut is adjusted longitudinally with reference to the thread of the screw, so that if the thread, either upon the screw or in the nut, becomes worn, the nut in this manner may be tightened or adjusted to the screw, so that there shall be no lost motion. This constitutes one of the important features of my invention.

In order that the nut may be stopped quickly when it is moving rapidly upon a revolving screw, and changed readily in its place upon the screw, each half of the nut has a projection thereon upon the side toward the main plate, and said plate has an aperture therein, into which is inserted the circular end of a lever having upon its face two eccentric slots or grooves, into which the projections upon the nut are inserted, when the lever is inserted into the aperture in the plate, so that by partially rotating the lever in its place in the plate the two halves of the nut are forced apart and away from the screw, and the nut may be moved to another place upon the screw, and by moving the lever back to its original position the two halves of the nut are brought together again, and in contact with the thread of the screw. This constitutes another important feature of my invention.

That others skilled in the art may be able to make and use my invention, I will proceed to describe its construction and operation.

In the drawing, A represents a plate having a circular hole, E', therein, shown in Figs. 5 and 6, and in said plate are made two slots, $d$, having a shoulder, $o$, therein, as shown in Figs. 1, 4, and 5. The plates D' each have a sufficient portion of a shell, D, made thereon to have a longitudinal slot made therein, through which extends the lip $a'$ of the nut $a$. This nut is made in two parts, as shown clearly in Fig. 4, and each part is held securely in place between the plates D' by means of the lip $a'$, which extends through the slot in the shell, as before mentioned, and by the screws $k$, which are turned through the ears $f$ on the plate D', and against each end of the lip $a'$. Each half of the nut $a$ has a projection, $b$, thereon, shown in Figs. 4 and 5, and a lever, B, has a projection, F, thereon, which is circular in form and fits into the circular hole F' in the plate A, and the part F has two curved slots, $c$, therein, which are made eccentric with the center of the part F, and when said part is inserted in the opening F' the projections $b$ pass into the said curved slots $c$. The part F has one or more studs, $g$, thereon, and the plate has one or more corresponding notches, $g'$, to receive the stud, and the plate A may be slightly recessed at $h$ to permit the stud to traverse the plate, the studs $g$ being for the purpose of holding the part F in its place in the opening of the plate. The plate A has two longitudinal slots or grooves, $s$, therein, in which operate the two projections $i$ upon the plates D', one upon each plate, which serve as guides to keep the plates D' in their proper position; and the plates D' are held to the plate A by means of the screws $e$ inserted through the slots $d$, the head of each screw coming against the shoulder $o$ in said slot. One side of the nut may be permanently set against the ear $f$ by turning the nut $n$ in firmly against the end of the lip $a'$; and the adjustment may be made upon the other half of the nut $a$ by turning either screw $k$ in or out and following up by the other one. The operation of this nut, when made in two parts as above described, is as follows: The lever B is adjusted to its place by inserting the circular part F in the circular opening F', the two projections $b$ passing into the curved slots $c$. If the arm of the lever B be turned so as to partially rotate the part F in its opening F', the eccentric curved slots will force the two projections $b$ and the two halves $a$ of the nut apart; and if the lever be turned in the opposite direction the slots will draw them together again. When drawn together the screw-thread upon the inside of the two halves of the nut engage with the thread upon the shaft E, and if the shaft be revolving the nut will be carried along; but if the halves of the nut be thrown apart the threads are instantly disengaged and the nut stops its movement along the shaft. This construction and arrangement of the nut is very useful and desirable for use in screw-cutting engines, and many lathes, card-machines, &c.; but for many other uses it might be desirable to dispense with the lever B and the plate A entirely, and also the projection $b$ upon each half of the nut; and in that case the two halves of the outer cylindrical shell D, or so much thereof as would suffice to keep the two parts of the nut $a$ in place, or to furnish a guide-slot for each lip $a'$, would be secured permanently together, with the nut made in two parts placed inside, as before, and with the lip $a'$ on each half projecting through its guide-slot in the outer shell. As thus constructed, without the plate A and lever B, the two screws $k$ would be used to adjust one-half the nut $a$ against one side of the screw-thread upon the shaft, the other half being adjusted against the other side of the thread; and this is the main feature of my invention, the manner of adjustment to take up the lost motion being precisely alike whether used with the plate A and lever B or without them. When used in this way, as the screw-thread upon the shaft becomes worn, and there is consequently more or less lost motion in the operation of the nut upon the shaft, such lost motion may be taken up and the nut may be made to operate perfectly tight upon the threaded shaft by slightly turning the screws $k$.

In practice it is not essential that the nut $a$ should be divided longitudinally, as it may with equal facility be divided transversely and one part connected with the other by a male and female screw-thread upon the outside of the nut, which is differential with the thread upon the shaft.

When divided longitudinally the two parts of the nut are connected with each other by the plates D', attached to the plate A, and the screws $k$ are differential with the screw-thread upon the shaft.

Having thus described my invention, what I claim as new, and desire to secure by Letters Patent, is—

1. A nut divided in two parts, each part operating in connection with the other upon a threaded shaft, one part being capable of being adjusted against one side of the thread upon the shaft, and the other part against the other side of the thread, substantially as and for the purpose described.

2. The nut $a$, divided longitudinally, and each part provided with the lip $a'$, against one of which are turned the screws $k$, operating through threaded holes in the plates D' to adjust the parts of the nut to the threaded shaft, in the manner substantially herein specified.

JAMES RUSSELL.

Witnesses:
T. A. CURTIS,
M. L. BOYNTON.